US012761588B2

(12) United States Patent
Nakajima et al.

(10) Patent No.: US 12,761,588 B2
(45) Date of Patent: Oct. 13, 2026

(54) HEATING APPARATUS INCLUDING A PLURALITY OF HEAT GENERATION MEMBERS, FIXING APPARATUS, AND IMAGE FORMING APPARATUS

(71) Applicant: Canon Kabushiki Kaisha, Tokyo (JP)

(72) Inventors: Nozomu Nakajima, Kawasaki (JP); Tomohiro Nakamori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/944,103

(22) Filed: Nov. 12, 2024

(65) Prior Publication Data

US 2025/0068105 A1 Feb. 27, 2025

Related U.S. Application Data

(63) Continuation of application No. 18/454,969, filed on Aug. 24, 2023, now Pat. No. 12,174,566, which is a continuation of application No. 17/979,222, filed on Nov. 2, 2022, now Pat. No. 11,774,888, which is a continuation of application No. 17/227,588, filed on Apr. 12, 2021, now Pat. No. 11,520,263, which is a (Continued)

(30) Foreign Application Priority Data

Jan. 18, 2019 (JP) ................................ 2019-006465

(51) Int. Cl.
*G03G 15/20* (2006.01)

(52) U.S. Cl.
CPC ..... *G03G 15/2042* (2013.01); *G03G 15/2053* (2013.01); *G03G 15/2064* (2013.01); *G03G 2215/2022* (2013.01)

(58) Field of Classification Search
USPC ........................................................ 399/122
See application file for complete search history.

(56) References Cited

U.S. PATENT DOCUMENTS

| | | | |
|---|---|---|---|
| 6,336,009 | B1 | 1/2002 | Suzumi et al. |
| 8,791,390 | B2 | 7/2014 | Taniguchi |
| 11,092,916 | B2 | 8/2021 | Yoshida et al. |

(Continued)

FOREIGN PATENT DOCUMENTS

| | | | |
|---|---|---|---|
| CN | 105739270 | A | 7/2016 |
| EP | 2950159 | A1 | 12/2015 |

(Continued)

OTHER PUBLICATIONS

Japanese Office Action dated Feb. 4, 2025 in counterpart Japanese Patent Appln. No. 2024-087676.

(Continued)

*Primary Examiner* — Quana Grainger
(74) *Attorney, Agent, or Firm* — Venable LLP

(57) ABSTRACT

The heating apparatus including a plurality of heat generation members including first, second and third generation members, the second heat generation member and the third heat generation member having lengths in a longitudinal direction shorter than a length of the first heat generation member, the heating apparatus including first, second, third, and fourth contacts, and a first switching unit configured to bring an electric path between the second contact and the fourth contact into one of a connecting state and an open state.

17 Claims, 11 Drawing Sheets

Related U.S. Application Data continuation of application No. 16/744,609, filed on Jan. 16, 2020, now Pat. No. 11,156,945.

(56) References Cited

U.S. PATENT DOCUMENTS

| | | | | |
|---|---|---|---|---|
| 2003/0196999 | A1* | 10/2003 | Kato | H05B 3/0095 219/216 |
| 2005/0280682 | A1 | 12/2005 | Kato et al. | |
| 2012/0000897 | A1 | 1/2012 | Shimura | |
| 2012/0155895 | A1 | 6/2012 | Shimura | |
| 2013/0071134 | A1 | 3/2013 | Hikari et al. | |
| 2014/0138372 | A1 | 5/2014 | Ogura | |
| 2015/0341985 | A1 | 11/2015 | Nakayama | |
| 2016/0011551 | A1 | 1/2016 | Nakayama | |
| 2016/0274510 | A1* | 9/2016 | Hase | G03G 15/2039 |
| 2017/0075266 | A1* | 3/2017 | Mochizuki | G03G 15/2053 |
| 2017/0364002 | A1 | 12/2017 | Ando | |
| 2020/0233350 | A1 | 7/2020 | Oi et al. | |

FOREIGN PATENT DOCUMENTS

| | | | |
|---|---|---|---|
| EP | 2950160 | A1 | 12/2015 |
| JP | H06337605 | A | 12/1994 |
| JP | 2000-250337 | A | 9/2000 |
| JP | 2001-100558 | A | 4/2001 |
| JP | 2006-4891 | A | 1/2006 |
| JP | 2006004860 | A | 1/2006 |
| JP | 2007178516 | A | 7/2007 |
| JP | 2012-037613 | A | 2/2012 |
| JP | 2013-235181 | A | 11/2013 |
| JP | 2020115185 | A | 7/2020 |
| JP | 7500824 | B2 | 6/2024 |

OTHER PUBLICATIONS

European Search Report issued on Jun. 22, 2020 in counterpart European Patent Application No. 20151917.0.

Chinese Office Action issued on Nov. 29, 2022 in counterpart Chinese Patent Application No. 202010051985.6.

Korean Office Action issued Nov. 27, 2023 in counterpart Korean Patent Appln. No. 10-2020-0006375.

Japanese Office Action issued Feb. 27, 2024 in counterpart Japanese Patent Appln. No. 2023-079884.

Korean Office Action issued Jul. 1, 2024 in counterpart Korean Patent Appln. No. 10-2020-0006375.

Extended European Search Report dated Jan. 26, 2026 in counterpart European Patent Appln. No. 25177577.1.

Chinese Office Action dated Apr. 1, 2026 in counterpart Chinese Patent Appln. No. 202310659599.9, with English translation.

Chinese Office Action dated Apr. 1, 2026 in counterpart Chinese Patent Appln. No. 202310662958.6, with English translation.

Japanese Office Action dated Jul. 14, 2026 in counterpart Japanese Patent Appln. No. 2025-142463.

* cited by examiner

CROSS SECTION p-p′

HEATING APPARATUS INCLUDING A PLURALITY OF HEAT GENERATION MEMBERS, FIXING APPARATUS, AND IMAGE FORMING APPARATUS

CROSS-REFERENCE TO RELATED APPLICATIONS

This application is a Continuation of U.S. patent application Ser. No. 18/454,969, filed Aug. 24, 2023, which is a Continuation of U.S. patent application Ser. No. 17/979,222, filed Nov. 2, 2022, issued as U.S. Pat. No. 11,774,888 on Oct. 3, 2023, which is a Continuation of U.S. patent application Ser. No. 17/227,588, filed Apr. 12, 2021, issued as U.S. Pat. No. 11,520,263 on Dec. 6, 2022, which is a Continuation of U.S. patent application Ser. No. 16/744,609, filed Jan. 16, 2020, issued as U.S. Pat. No. 11,156,945 on Oct. 26, 2021, which claims priority to Japanese Patent Application No. 2019-006465, filed Jan. 18, 2019, the entire contents of which are each hereby incorporated by reference herein.

BACKGROUND OF THE INVENTION

Field of the Invention

The present invention relates to a heating apparatus, a fixing apparatus, and an image forming apparatus, and relates to a fixing heater used in an image forming apparatus, and a control circuit that controls the fixing heater.

Description of the Related Art

In a heating apparatus using a ceramic heater as a heating source, when a recording paper (hereinafter referred to as a small size sheet) having a width shorter than the length of a heat generation member is conveyed, it is known that the following phenomena occur. That is, in a heat generation area and a non-sheet feeding area of the heat generation member, it is known that a phenomenon (hereinafter referred to as the non-sheet-feeding portion temperature rising) occurs in which the temperature becomes higher compared with the temperature in a sheet feeding area. The heat generation area refers to an area in which the heat generation member generates heat. The non-sheet feeding area refers to an area that does not contact a small size sheet in the heat generation area. The sheet feeding area refers to an area that contacts a small size sheet in the heat generation area. The non-sheet-feeding portion temperature rising is also referred to as the end portion temperature rise. When the increase in the temperature in the non-sheet-feeding portion temperature rising becomes too large, there is a possibility of damaging a surrounding member, such as a member supporting the ceramic heater. Therefore, many proposals have been made for heating apparatuses and image forming apparatuses that enable to reduce the non-sheet-feeding portion temperature rising, by including a plurality of heat generation members having different lengths, and selectively using the heat generation member having a length corresponding to the width of a recording paper. For example, in Japanese Patent Application Laid-Open No. 2001-100558, it is disclosed to aim at effective use of a substrate by commonalizing at least a part of electrodes of a plurality of heat generation members that are provided on an insulating substrate, and that can be independently driven. Additionally, a proposal has been made to provide the same number of electrodes in both ends of a substrate, so as to commonalize connectors to be connected to the ends, and to equalize the heat distribution in a longitudinal direction of the ceramic heater.

In conventional examples, the configuration is described that switches heat generation members supplying electric power by a contact switch (an electromagnetic relay having the c-contact configuration). When the electromagnetic relay having the c-contact configuration is operated in the configuration of a conventional example, arc discharge occurs between the contacts of the relay. Usually, when operating an electromagnetic relay, it is performed by stopping the electric power supply to the heat generation members (by bringing a triac into a non-conductive state). This is because an arc current flows via the capacity component of the both ends of the triac (the stray capacitance of a wiring pattern, noise suppression components arranged in the both ends of the triac, etc.), etc., since there is a potential difference between the contacts of the electromagnetic relay in this state in the configuration of a conventional example. When arc discharge occurs between the contacts of the electromagnetic relay, there is a possibility of causing the problem of EMI by emitting electromagnetic noise, causing a malfunction of an electromagnetic relay peripheral circuit, etc. Additionally, when arc discharge occurs between the contacts of the electromagnetic relay, contact wear will occur, and the life of the electromagnetic relay, and consequently, the life of an apparatus will become short.

SUMMARY OF THE INVENTION

An aspect of the present invention is a heating apparatus including a plurality of heat generation members including a first heat generation member, and a second heat generation member and a third heat generation member whose lengths are shorter than a length of the first heat generation member in a longitudinal direction, the heating apparatus having a first contact to which one end of the first heat generation member is connected, a second contact to which one end of the second heat generation member and one end of the third heat generation member are connected, a third contact to which another end of the third heat generation member is connected, a fourth contact to which another end of the first heat generation member and another end of the second heat generation member are connected, and a first switching unit configured to bring an electric path between the second contact and the fourth contact into one of a connecting state and an open state.

Another aspect of the present invention is a heating apparatus including a plurality of heat generation members including a first heat generation member, and a second heat generation member and a third heat generation member, the second heat generation member and the third heat generation member having lengths in a longitudinal direction shorter than a length of the first heat generation member, the heating apparatus having a first contact to which one end of the first heat generation member is connected, a second contact to which one end of the second heat generation member and one end of the third heat generation member are connected, a third contact to which another end of the third heat generation member is connected, a fourth contact to which another end of the first heat generation member and another end of the second heat generation member are connected, and a third switching unit configured to bring an electric path between the third contact and the fourth contact into one of a connecting state and an open state.

A further aspect of the present invention is a fixing apparatus including a heating apparatus including a plurality of heat generation members including a first heat generation member, and a second heat generation member and a third heat generation member whose lengths are shorter than a length of the first heat generation member in a longitudinal direction, the heating apparatus having a first contact to which one end of the first heat generation member is connected, a second contact to which one end of the second heat generation member and one end of the third heat generation member are connected, a third contact to which another end of the third heat generation member is connected, a fourth contact to which another end of the first heat generation member and another end of the second heat generation member are connected, and a first switching unit configured to bring an electric path between the second contact and the fourth contact into one of a connecting state and an open state, wherein the fixing apparatus fixes a toner image on a recording material by the heating apparatus.

A still further aspect of the present invention is an image forming apparatus including an image forming unit configured to form a toner image on a recording material, and a fixing apparatus including a heating apparatus including a plurality of heat generation members including a first heat generation member, and a second heat generation member and a third heat generation member whose lengths are shorter than a length of the first heat generation member in a longitudinal direction, the heating apparatus having a first contact to which one end of the first heat generation member is connected, a second contact to which one end of the second heat generation member and one end of the third heat generation member are connected, a third contact to which another end of the third heat generation member is connected, a fourth contact to which another end of the first heat generation member and another end of the second heat generation member are connected, and a first switching unit configured to bring an electric path between the second contact and the fourth contact into one of a connecting state and an open state, wherein the fixing apparatus fixes a toner image on a recording material by the heating apparatus.

Further features of the present invention will become apparent from the following description of exemplary embodiments with reference to the attached drawings.

DESCRIPTION OF THE EMBODIMENTS

Embodiment 1

In the following embodiments, when three systems of heat generation members are included and three kinds of power supply paths are switched, a contact switch is used in the switching of one kind of the power supply paths. The configuration will be described in which, even in a case where the power supply paths are switched by using the contact switch, electromagnetic noise due to arc discharge is not emitted at the time of the contact switch operation, and the life reduction due to contact wear does not occur.

Additionally, in a heating apparatus including three or more systems of heat generation members, the same number of electrodes (a first contact to a fourth contact described below) are provided in the both ends of a substrate. Accordingly, it is aimed to commonalize connectors to be connected to the both ends of the substrate, and to equalize the heat distribution in the longitudinal direction of the ceramic heater.

[General Configuration]

Figure 1:
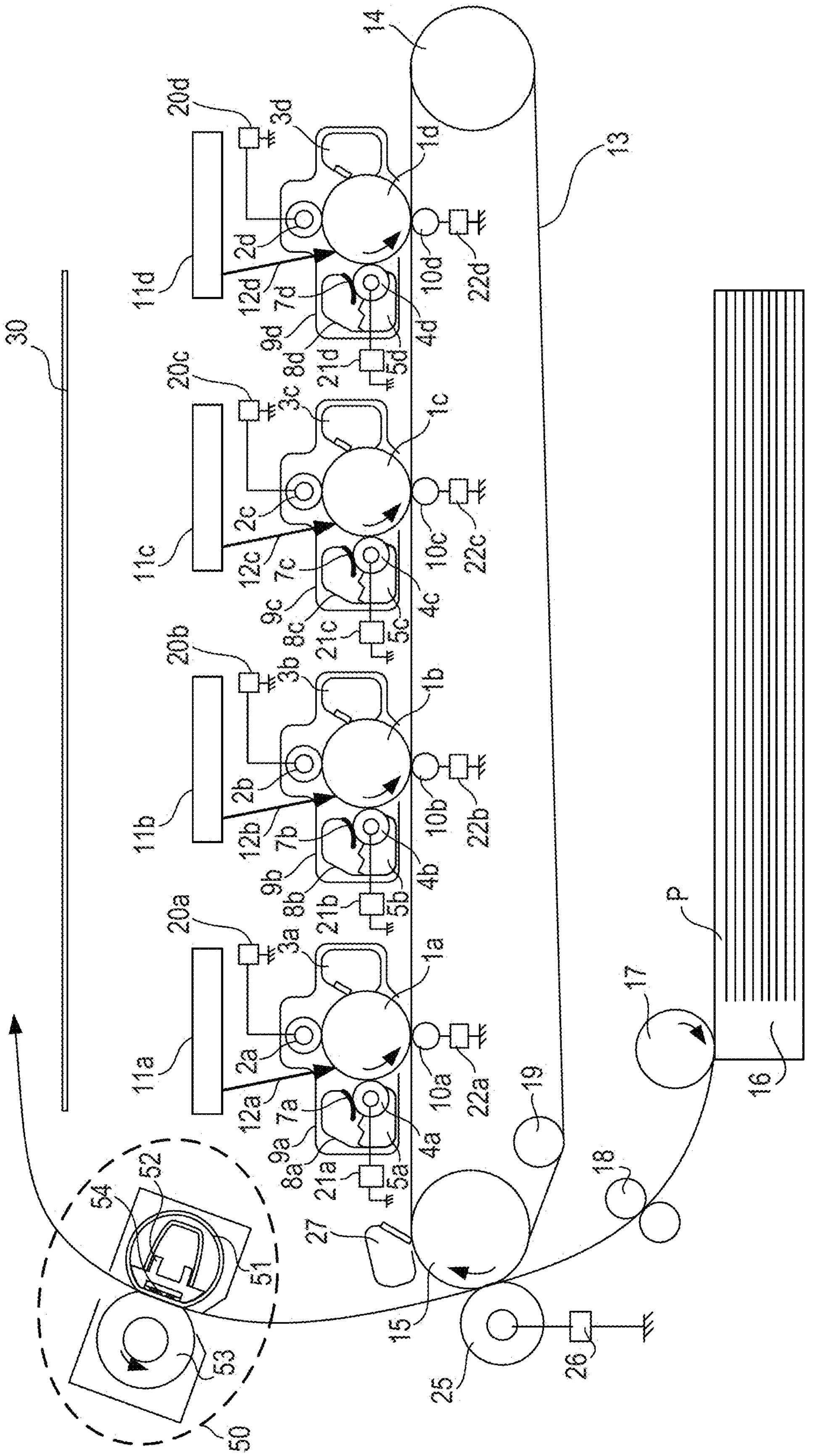
FIG. 1 is a general configuration diagram of an image forming apparatus of Embodiments 1 to 4.

FIG. 1 is a configuration diagram illustrating a color image forming apparatus of the in-line system, which is an example of an image forming apparatus carrying a fixing apparatus of an Embodiment 1. The operation of the color image forming apparatus of the electrophotography system will be described by using FIG. 1. Note that a first station is the station for toner image formation of a yellow (Y) color, and a second station is the station for toner image formation of a magenta (M) color. Additionally, a third station is the station for toner image formation of a cyan (C) color, and a fourth station is the station for toner image formation of a black (K) color.

In the first station, a photosensitive drum 1*a*, which is an image carrier, is an OPC photosensitive drum. The photosensitive drum 1*a* is formed by stacking, on a metal cylinder, a plurality of layers of functional organic materials including a carrier generation layer exposed and generates an electric charge, a charge transport layer transporting the generated electric charge, etc., and the outermost layer has a low electric conductivity and is almost insulated. A charge roller 2*a*, which is a charging unit, contacts the photosensitive drum 1*a*, and uniformly charges a surface of the photosensitive drum 1*a* while performing following rotation with the rotation of the photosensitive drum 1*a*. The voltage superimposed with one of a DC voltage and an AC voltage is applied to the charge roller 2*a*, and when an electric discharge occurs in minute air gaps on the upstream side and the downstream side of a rotation direction from a nip portion between the charge roller 2*a* and the surface of the photosensitive drum 1*a*, the photosensitive drum 1*a* is charged. A cleaning unit 3*a* is a unit that cleans a toner remaining on the photosensitive drum 1*a* after the transfer, which will be described later. A development unit 8*a*, which is a developing unit, includes a developing roller 4*a*, a nonmagnetic monocomponent toner 5*a* and a developer application blade 7*a*. The photosensitive drum 1*a*, the charge roller 2*a*, the cleaning unit 3*a* and the development unit 8*a* form an integral-type process cartridge 9*a* that can be freely attached to and detached from the image forming apparatus.

An exposure device 11*a*, which is an exposing unit, includes one of a scanner unit scanning a laser beam with a polygon mirror, and an LED (light emitting diode) array, and irradiates a scanning beam 12*a* modulated based on an image signal on the photosensitive drum 1*a*. Additionally, the charge roller 2*a* is connected to a high voltage power supply for charge 20*a*, which is a voltage supplying unit to the charge roller 2*a*. The developing roller 4*a* is connected to a high voltage power supply for development 21*a*, which is a voltage supplying unit to the developing roller 4*a*. A primary transfer roller 10*a* is connected to a high voltage power supply for primary transfer 22*a*, which is a voltage supplying unit to the primary transfer roller 10*a*. The first station is configured as described above, and the second, third and fourth stations are also configured in the same manner. For the other stations, the identical numerals are assigned to the components having the identical functions as those of the first station, and b, c and d are assigned as the subscripts of the numerals for the respective stations. In the following description, subscripts a, b, c and d are omitted except for the case where a specific station is described.

An intermediate transfer belt 13 is supported by three rollers, i.e., a secondary transfer opposing roller 15, a tension roller 14 and an auxiliary roller 19, as its stretching members. The force in the direction of stretching the intermediate transfer belt 13 is applied only to the tension roller 14 by a spring, and a suitable tension force for the intermediate transfer belt 13 is maintained. The secondary transfer opposing roller 15 is rotated in response to the rotation drive from a main motor (not illustrated), and the intermediate transfer belt 13 wound around the outer circumference is rotated. The intermediate transfer belt 13 moves at substantially the same speed in a forward direction (for example, the clockwise direction in FIG. 1) with respect to the photosensitive drums 1*a* to 1*d* (for example, rotated in the counter clockwise direction in FIG. 1). Additionally, the intermediate transfer belt 13 is rotated in an arrow direction (the clockwise direction), and the primary transfer roller 10 is arranged on the opposite side of the photosensitive drum 1 across the intermediate transfer belt 13, and performs the following rotation with the movement of the intermediate transfer belt 13. The position at which the photosensitive drum 1 and the primary transfer roller 10 contact each other across the intermediate transfer belt 13 is referred to as a primary transfer position. The auxiliary roller 19, the tension roller 14 and the secondary transfer opposing roller 15 are electrically grounded. Note that, also in the second to fourth stations, since primary transfer rollers 10*b* to 10*d* are configured in the same manner as the primary transfer roller 10*a* of the first station, a description will be omitted.

Next, the image forming operation of the image forming apparatus of Embodiment 1 will be described. The image forming apparatus starts the image forming operation, when a print command is received in a standby state. The photosensitive drum 1, the intermediate transfer belt 13, etc. start rotation in the arrow direction at a predetermined process speed by the main motor (not illustrated). The photosensitive drum 1*a* is uniformly charged by the charge roller 2*a* to which the voltage is applied by the high voltage power supply for charge 20*a*, and subsequently, an electrostatic latent image according to image information is formed by the scanning beam 12*a* irradiated from the exposure device 11*a*. A toner 5*a* in the development unit 8*a* is charged in negative polarity by the developer application blade 7*a*, and is applied to the developing roller 4*a*. Then, a predetermined developing voltage is supplied to the developing roller 4*a* by the high voltage power supply for development 21*a*. When the photosensitive drum 1*a* is rotated, and the electrostatic latent image formed on the photosensitive drum 1*a* reaches the developing roller 4*a*, the electrostatic latent image is visualized when the toner of negative polarity adheres, and a toner image of the first color (for example, Y (yellow)) is formed on the photosensitive drum 1*a*. The respective stations (process cartridges 9*b* to 9*d*) of the other colors M (magenta), C (cyan) and K (black) are also similarly operated. An electrostatic latent image is formed on each of the photosensitive drums 1*a* to 1*d* by exposure, while delaying a writing signal from a controller (not illustrated) with a fixed timing, according to the distance between the primary transfer positions of the respective colors. A DC high voltage having the reverse polarity to that of the toner is applied to each of the primary transfer rollers 10*a* to 10*d*. With the above-described processes, toner images are sequentially transferred to the intermediate transfer belt 13 (hereinafter referred to as the primary transfer), and a multi toner image is formed on the intermediate transfer belt 13.

Thereafter, according to imaging of the toner image, a paper P that is a recording material loaded in a cassette 16 is fed (picked up) by a sheet-feeding roller 17 rotated and driven by a sheet-feeding solenoid (not illustrated). The fed paper P is conveyed to a registration roller (hereinafter referred to as the resist roller) 18 by a conveyance roller. The paper P is conveyed by the resist roller 18 to a transfer nip portion, which is a contacting portion between the intermediate transfer belt 13 and a secondary transfer roller 25, in synchronization with the toner image on the intermediate transfer belt 13. The voltage having the reverse polarity to that of the toner is applied to the secondary transfer roller 25 by a high voltage power supply for secondary transfer 26, and the four-color multi toner image carried on the intermediate transfer belt 13 is collectively transferred onto the paper P (onto the recording material) (hereinafter referred to as the secondary transfer). The members (for example, the photosensitive drum 1) that have contributed to the formation of the unfixed toner image on the paper P function as an image forming unit. On the other hand, after completing the secondary transfer, the toner remaining on the intermediate transfer belt 13 is cleaned by a cleaning unit 27. The paper P to which the secondary transfer is completed is conveyed to a fixing apparatus 50, which is a fixing unit, and is discharged to a discharge tray 30 as an image formed matter (a print, a copy) in response to fixing of the toner image. The fixing apparatus 50 corresponds to the heating apparatus of the present invention. A film 51 of the fixing apparatus 50, a nip forming member 52, a pressure roller 53 and a heater 54 will be described later.

[Block Diagram of Image Forming Apparatus]

Figure 2:
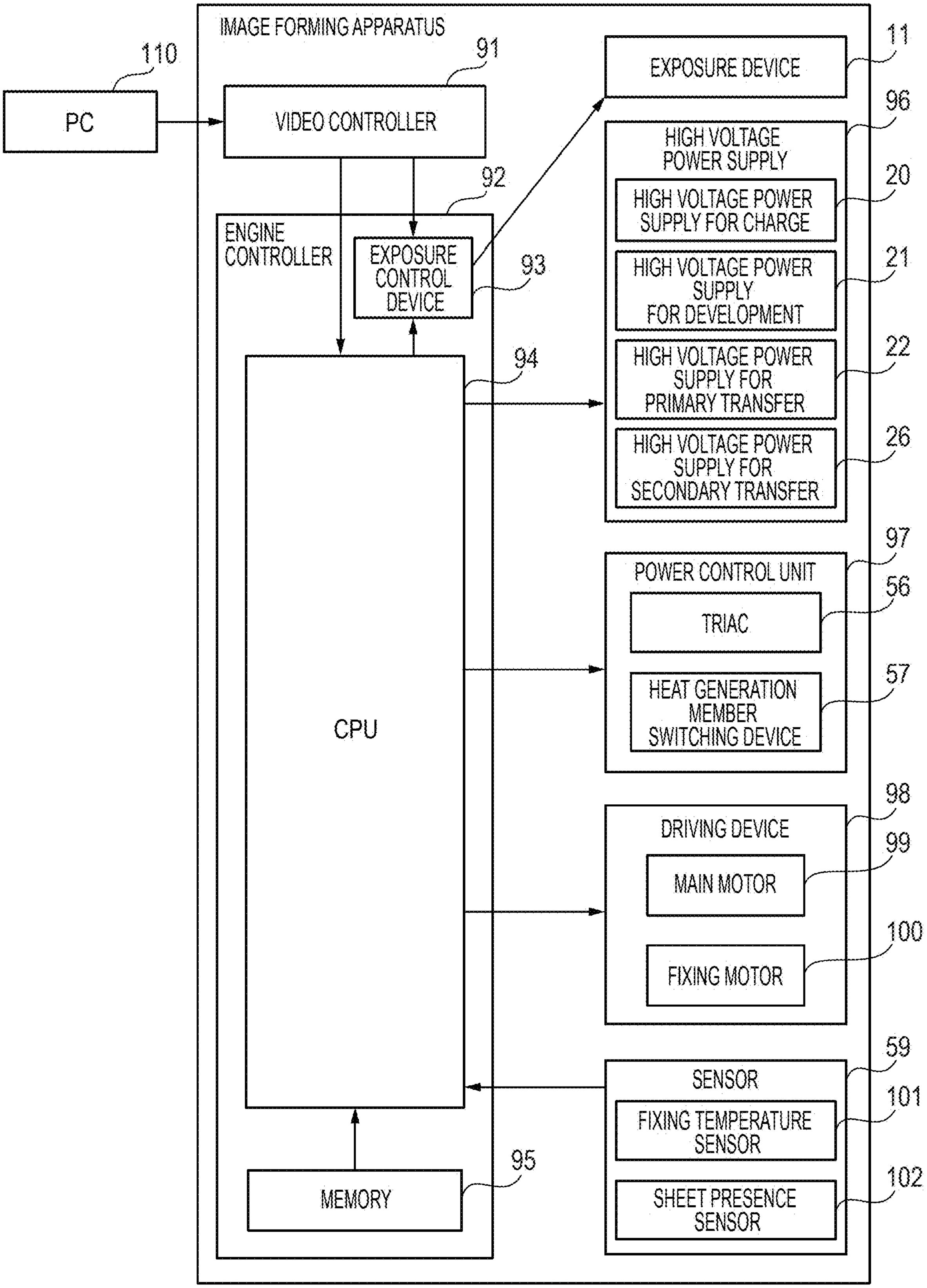
FIG. 2 is a control block diagram of the image forming apparatus of Embodiments 1 to 4.

FIG. 2 is a block diagram for describing the operation of the image forming apparatus, and referring to this drawing, the print operation of the image forming apparatus will be described. A PC 110, which is a host computer, outputs a print command to a video controller 91 inside the image forming apparatus, and plays the role of transferring image data of a printing image to the video controller 91.

The video controller 91 converts the image data from the PC 110 into exposure data, and transfers it to an exposure control device 93 inside an engine controller 92. The exposure control device 93 is controlled from a CPU 94, and performs turning on and off of exposure data, and control of the exposure device 11. The CPU 94, which is a control unit, starts an image forming sequence, when a print command is received.

The CPU 94, a memory 95, etc. are mounted in the engine controller 92, and the operation programmed in advance is performed. The high voltage power supply 96 includes the above-described high voltage power supply for charge 20, high voltage power supply for development 21, high voltage power supply for primary transfer 22 and high voltage power supply for secondary transfer 26. Additionally, a power control unit 97 includes a bidirectional thyristor (hereinafter referred to as the triac) 56, a heat generation member switching device 57 that switches the heat generation members supplying power, etc. The power control unit 97 selects the heat generation member that generates heat in the fixing apparatus 50, and determines the electric energy to be supplied. Additionally, a driving device 98 includes a main motor 99, a fixing motor 100, etc. In addition, a sensor 101 includes a fixing temperature sensor 59 that detects the temperature of the fixing apparatus 50, a sheet presence sensor 102 that has a flag and detects the existence of the paper P, etc., and the detection result of the sensor 101 is transmitted to the CPU 94. The CPU 94 obtains the detection result of the sensor 101 in the image forming apparatus, and controls the exposure device 11, the high voltage power supply 96, the power control unit 97 and the driving device 98. Accordingly, the CPU 94 performs the formation of an electrostatic latent image, the transfer of a developed toner image, the fixing of a toner image to the paper P, etc., and controls an image formation process in which the exposure data is printed on the paper P as the toner image. Note that the image forming apparatus to which the present invention is applied is not limited to the image forming apparatus having the configuration described in FIG. 1, and may be an image forming apparatus that can print papers P having different widths, and that includes the fixing apparatus 50 including the heater 54, which will be described later.

[Fixing Apparatus]

Figure 3:
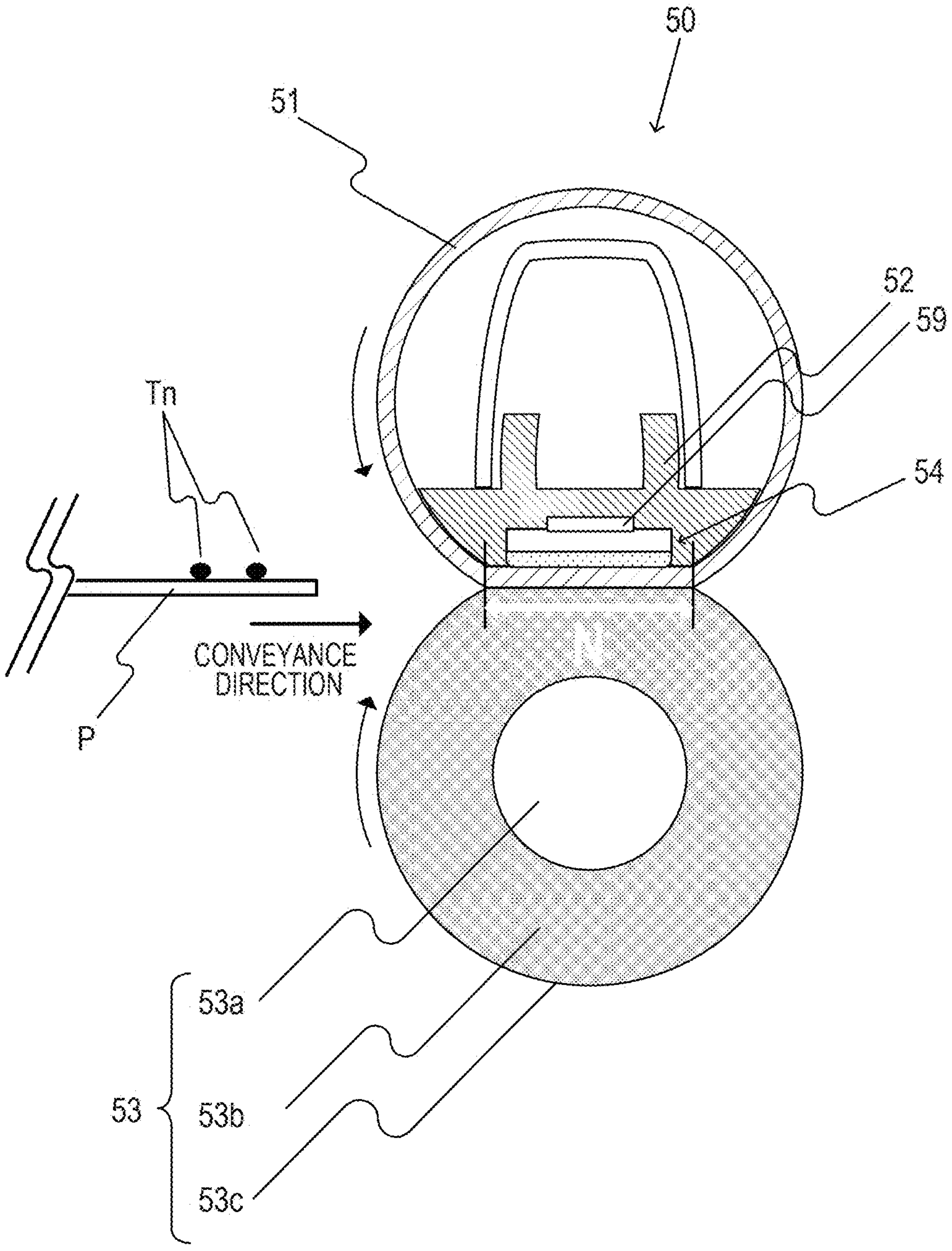
FIG. 3 is a cross-sectional schematic diagram in the vicinity of center portion in a longitudinal direction of a fixing apparatus of Embodiments 1 to 4.

Next, the configuration of the fixing apparatus 50 in Embodiment 1 will be described by using FIG. 3. Here, the longitudinal direction is the rotation axis direction of the pressure roller 53 substantially perpendicular to the conveyance direction of the paper P described later. Additionally, the length of the paper P in the direction (the longitudinal direction) substantially perpendicular to the conveyance direction is referred to as the width. FIG. 3 is a cross-sectional schematic diagram of the fixing apparatus 50.

The paper P holding an unfixed toner image Tn is heated while conveyed from the left side in FIG. 3 toward the right in a fixation nip portion N, and thus the toner image In is fixed to the paper P. The fixing apparatus 50 in Embodiment 1 includes a cylindrical film 51, the nip forming member 52 holding the film 51, the pressure roller 53 forming the fixation nip portion N with the film 51, and the heater 54 for heating the paper P.

The film 51, which is a first rotary member, is a fixing film as a heating rotary member. In Embodiment 1, for example, polyimide is used as a base layer. An elastic layer made of silicone rubber, and a release layer made of PFA are used on the base layer. In order to reduce the frictional force generated between film 51, and the nip forming member 52 and the heater 54 by rotation of the film 51, grease is applied to the inner surface of the film 51.

The nip forming member 52 plays the role of guiding the film 51 from the inner side, and forming the fixation nip portion N between the nip forming member 52 and the pressure rollers 53 via the film 51. The nip forming member 52 is a member having rigidity, heat resistance and insulation properties, and is formed by a liquid crystal polymer, etc. The film 51 is fit onto this nip forming member 52. The pressure roller 53, which is a second rotary member, is a roller as a pressing rotary member. The pressure roller 53 includes a cored bar 53*a*, an elastic layer 53*b* and a release layer 53*c*. The pressure roller 53 is rotatably maintained at both ends, and is rotated and driven by the fixing motor 100 (see FIG. 2). Additionally, the film 51 performs the following rotation by the rotation of the pressure roller 53. The heater 54, which is a heating member, is maintained by the nip forming member 52, and contacts the inner surface of the film 51. The fixing temperature sensor 59 detects the temperature of the heater 54. The heater 54 will be described later.

[Heater and Heater Control Circuit]

Figure 4A:
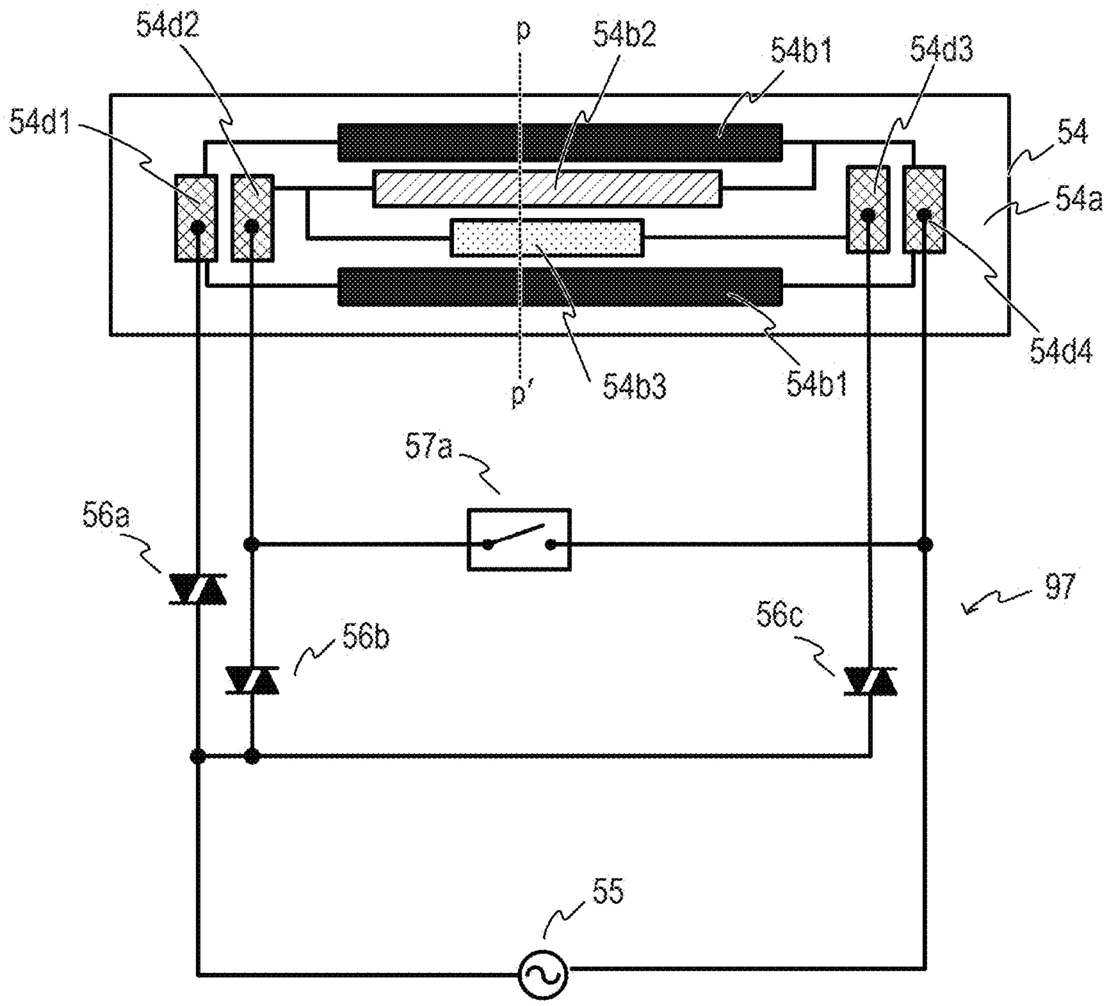
FIG. 4A illustrates a heater and a heater control circuit described in Embodiment 1.
Figure 4B:
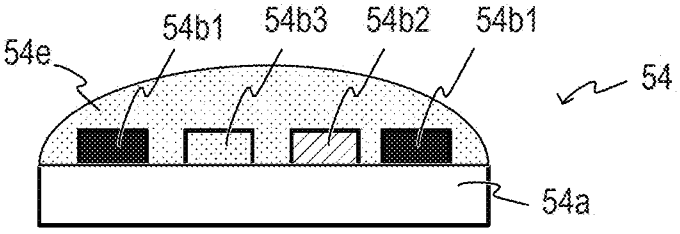
FIG. 4B illustrates a cross-section of the heater described in Embodiment 1.

A heater, and the power control unit 97, which is the heater control circuit, used in the heating apparatus of Embodiment 1 are illustrated in FIG. 4A and FIG. 4B. FIG. 4A illustrates the heater 54 and the power control unit 97 used in Embodiment 1, and FIG. 4B illustrates the p-p' cross-section of the heater 54. The heater 54 mainly includes heat generation members 54*b*1 to 54*b*3, contacts 54*d*1 to 54*d*4, and a cover glass layer 54*e*, such as insulating glass, mounted on a substrate 54*a* (on a substrate) formed by ceramic, etc. The heat generation members 54*b*1 to 54*b*3 are resistors that generate heat by the power supply from an AC power supply 55, such as a commercial AC power. The contact 54*d*1 and the contact 54*d*2 are provided in one end of the substrate 54*a* in the longitudinal direction, and the contact 54*d*3 and the contact 54*d*4 are provided in the other end of the substrate 54*a* in the longitudinal direction. In this manner, the numbers of the contacts (electrodes) provided in the both ends of the substrate 54*a* are made the same; for example, two. The cover glass layer 54*e* is provided to insulate a user from the heat generation members 54*b*1 to 54*b*3 having almost the same electric potential as the AC power supply 55.

The heat generation member 54*b*1, which is a first heat generation member, is a heat generation member mainly used when fixing a toner to the paper P having the maximum width among papers P that can be conveyed in the heating apparatus. Here, the width refers to the direction substantially perpendicular to the conveyance direction of the paper P, and is also the longitudinal direction of the heater 54. Therefore, the length (size) of the heat generation member 54*b*1 in the longitudinal direction is set to be longer than the width of the letter size 215.9 mm by about several millimeters. As illustrated in FIG. 4A and FIG. 4B, two heat generation members 54*b*1 are arranged at both sides of the substrate 54*a* on the upstream side and the downstream side of the conveyance direction (the up-and-down direction in FIG. 4A) of the paper P, so as to sandwich the heat generation members 54*b*2 and 54*b*3. In the longitudinal direction of the substrate 54*a*, the heat generation member 54*b*2 and the heat generation member 54*b*3 are arranged in the area of the heat generation member 54*b*1. Additionally, the heat generation member 54*b*1 is the heat generation member mainly used also when the heating apparatus is activated (that is, when the temperature is increased to a predetermined temperature from the state where the heating apparatus is cold (the state where the temperature is substantially the same as the room temperature)). Therefore, the heat generation member 54*b*1 is designed to be able to supply power required at the time of activation of the heating apparatus. The heat generation member 54*b*1 is connected to the contact 54*d*1, which is a first contact, and to the contact 54*d*4, which is a fourth contact.

The heat generation member 54*b*2, which is a second heat generation member, is the heat generation member corresponding to the width of the B5 size, and the length of the heat generation member 54*b*2 in the longitudinal direction is set to be longer than the width of the B5 size 182 mm by about several millimeters. The heat generation member **54*b*2 is connected to the contact 54*d*2, which is a second contact, and to the contact 54*d*4. The heat generation member 54*b*3, which is a third heat generation member, is the heat generation member corresponding to the width of the A5 size, and the length of the heat generation member 54*b*3 in the longitudinal direction is set to be longer than the width of the A5 size 148 mm by about several millimeters. The heat generation member 54*b*3 is connected to the contact 54*d*2 and to the contact 54*d*3**, which is a third contact.

It is assumed that the heat generation member **54*b*2 and the heat generation member 54*b*3 are used in a state where the heating apparatus has been warmed up to some extent, and the rated powers of the heat generation member 54*b*2 and the heat generation member 54*b*3 are set to be lower than the rated power of the heat generation member 54*b*1. That is, the heat generation member 54*b*1 serves as a main heater, and the heat generation members 54*b*2 and 54*b*3 serve as sub heaters. Accordingly, the main heater (the heat generation member 54*b*1) and the sub heaters (the heat generation members 54*b*2 and 54*b*3) are used while switched, mainly at the time of activation and a load change. Additionally, the heater 54 includes the three systems of heat generation members 54*b*1 to 54*b*3 having different lengths in the width direction of the paper P. Accordingly, it is aimed to suppress the non-sheet-feeding portion temperature rising, and to achieve a high productivity even in a case where the paper P having the width less than the letter size or the A4 size (hereinafter referred to as a small size sheet) is printed. Accordingly, also in this perspective, the performance of the heater 54 is delivered by frequently switching the main heater (the heat generation member 54*b*1) and the sub heaters (the heat generation members 54*b*2 and 54*b*3**).

The contact **54*d*1 is connected to the first pole of the AC power supply 55 via a bidirectional thyristor (hereinafter referred to as a triac) 56*a*, which is a first turn-on switch unit. The contact 54*d*2 is connected to the first pole of the AC power supply 55 via a triac 56*b*, which is a second turn-on switch unit. The contact 54*d*3 is connected to the first pole of the AC power supply 55 via a triac 56*c*, which is a third turn-on switch unit. The contact 54*d*4 is connected to the second pole of the AC power supply 55, without a triac, etc. The contact 54*d*2 and the contact 54*d*4 are connected via an electromagnetic relay 57*a* having the a-contact configuration, which is a first switching unit. The electromagnetic relay 57*a* brings the electric path (the power supply path) between the contact 54*d*2 and the contact 54*d*4 into one of a connecting state (hereinafter also referred to as the short circuit state), and an open state. The electromagnetic relay 57*a* is not limited to the electromagnetic relay having the a-contact configuration, and a contact switch, such as an electromagnetic relay having the b-contact configuration, and an electromagnetic relay having the c-contact configuration, may be used. Further, a contactless switch, such as a solid state relay (SSR), a photoMOS relay, and a triac, may be used for the electromagnetic relay 57*a***.

[Power Supply Path]

Figure 5A:
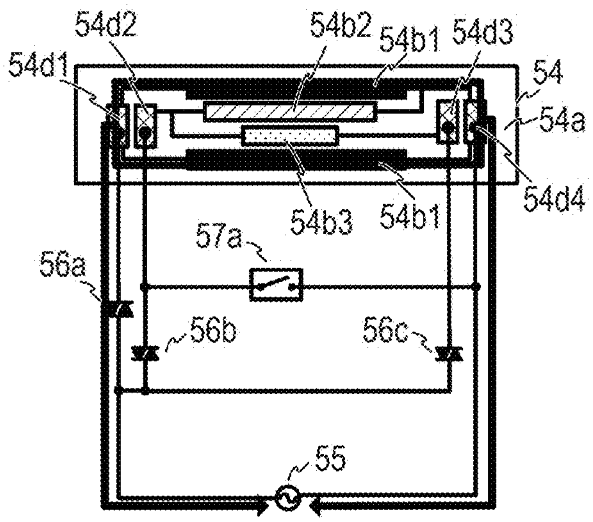
FIGS. 5A, 5B and 5C are diagrams illustrating the heater and the current path of the heater control circuit described in Embodiment 1.
Figure 5B:
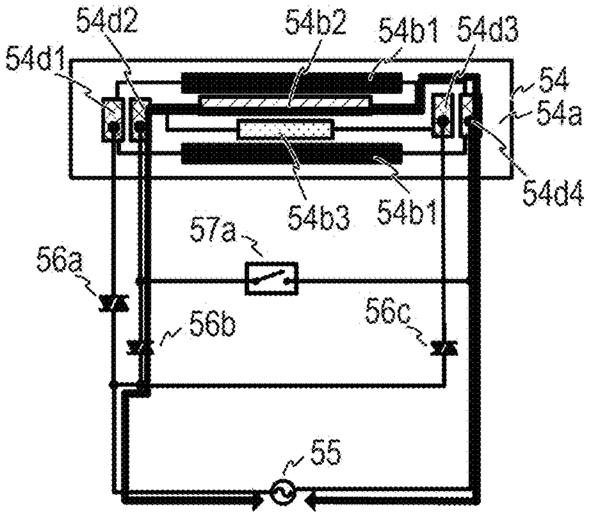
Figure 5C:
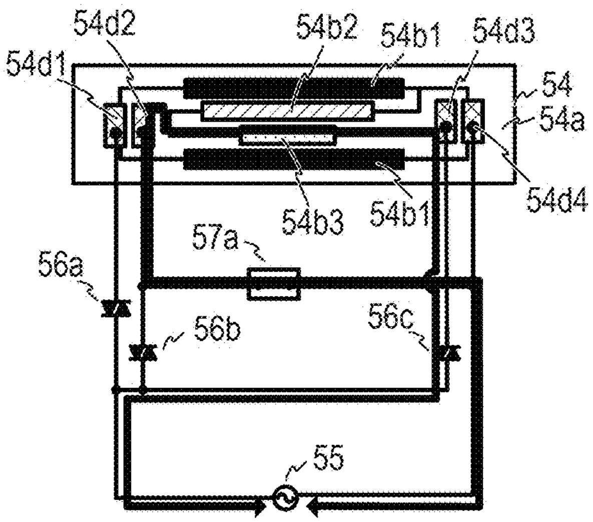

FIG. 5A to FIG. 5C illustrate three kinds of current paths (they are electric paths, and are also power supply paths) to the heat generation members **54*b*1 to 54*b*3 in a case where the heater 54 and the power control unit 97** of Embodiment 1 are used.

(Power Supply to the Heat Generation Member **54*b*1**)

The current in a case where power is supplied from the AC power supply 55 to the heat generation member **54*b*1 flows in the route indicated by a bold line in FIG. 5A. The heat generation member 54*b*1 is controlled to be at a predetermined temperature by detecting the temperature of the heater 54 by a temperature detection element (not illustrated) such as a thermistor, and operating the triac 56*a* based on an instruction from a microcomputer (not illustrated) based on the temperature information. The power supply to the heat generation member 54*b*1 does not depend on the triacs 56*b* and 56*c* and the electromagnetic relay 57*a* having the a-contact configuration. That is, in a case where power is supplied to the heat generation member 54*b*1, the electromagnetic relay 57*a* may be in the open state, or may be in the short circuit state. Note that, in FIG. 5A, the electromagnetic relay 57*a*** is in the open state as an example.

(Power Supply to the Heat Generation Member **54*b*2**)

The current in a case where power is supplied from the AC power supply 55 to the heat generation member **54*b*2 flows in the route indicated by a bold line in FIG. 5B. In a case where power is supplied to the heat generation member 54*b*2, the contact of the electromagnetic relay 57*a* having the a-contact configuration is set to the open state. Since the contact impedance of the electromagnetic relay 57*a* having the a-contact configuration in the open state is sufficiently larger than the heat generation member 54*b*2, a current hardly flows into the electromagnetic relay 57*a* having the a-contact configuration, and only the heat generation member 54*b*2 can be made to generate heat. The power supplied to the heat generation member 54*b*2 is controlled by the triac 56*b***.

(Power Supply to the Heat Generation Member **54*b*3**)

The current in a case where power is supplied from the AC power supply 55 to the heat generation member **54*b*3 flows in the route indicated by a bold line in FIG. 5C. In a case where power is supplied to the heat generation member 54*b*3, almost all the current flows into the heat generation member 54*b*3, by setting the contact of the electromagnetic relay 57*a* having the a-contact configuration to the short circuit state. Since the contact impedance of the electromagnetic relay 57*a* having the a-contact configuration in the short circuit state is sufficiently smaller than the heat generation member 54*b*2, a current hardly flows into the heat generation member 54*b*2, and only the heat generation member 54*b*3 can be made to generate heat. The power supplied to the heat generation member 54*b*3 is controlled by the triac 56*c***.

[Switching of Power Supply Paths]

For switching between the power supply path (FIG. 5A) to the heat generation member **54*b*1 and the power supply path (FIG. 5B) to the heat generation member 54*b*2, the contact of the electromagnetic relay 57*a* having the a-contact configuration is brought into the open state in advance. The switching between the power supply path (FIG. 5A) and the power supply path (FIG. 5B) to the heat generation member 54*b*2 can be independently controlled only by contactless switches of the triac 56*a* and the triac 56*b*. Since the state transition can be performed only with the operation of the contactless switches (=the triacs), transition between the power supply path (FIG. 5A) and the power supply path (FIG. 5B) can be frequently performed, and the power supply path (FIG. 5A) and the power supply path (FIG. 5**B) can be used concurrently.

The same applies to the power supply path (FIG. 5A) to the heat generation member **54*b*1, and the power supply path (FIG. 5C) to the heat generation member 54*b*3. The contact of the electromagnetic relay 57*a* having the a-contact configuration is brought into the short circuit state in advance, and the path is switched by control of the triac 56*a* and the triac 56*b*. Since the state transition can be performed only with the operation of the contactless switches (=the triacs), transition between the power supply path (FIG. 5A) and the power supply path (FIG. 5C) can be frequently performed, and the power supply path (FIG. 5A) and the power supply path (FIG. 5**C) can be used concurrently.

On the other hand, when switching between the power supply path (FIG. 5B) of the heat generation member 54*b*2, and the power supply path (FIG. 5C) of the heat generation member 54*b*3, it is necessary to switch the state of the electromagnetic relay 57*a* having the a-contact configuration. Here, the both ends of the electromagnetic relay 57*a* having the a-contact configuration are connected to the both ends of the heat generation member 54*b*2. Accordingly, when the triac 56*b* is not conducted, irrespective of whether the electromagnetic relay 57*a* having the a-contact configuration is in the open state or in the short circuit state, the both ends of the electromagnetic relay 57*a* having the a-contact configuration have the same electric potential. Therefore, arc discharge does not occur between the contacts of the electromagnetic relay 57*a* having the a-contact configuration at the time of operation of the electromagnetic relay 57*a* having the a-contact configuration (the electromagnetic relay 57*a* is operated when the triac 56*b* is not conducted). Accordingly, electromagnetic noise is not emitted, and the contact wear (=the life reduction) due to arc discharge also does not occur. Accordingly, although the power supply path (FIG. 5B) and the power supply path (FIG. 5C) are exclusive, the power supply path (FIG. 5B) and the power supply path (FIG. 5C) can be switched with a high degree of freedom.

Note that, by using the heater 54 and the power control unit 97 of Embodiment 1, not only elimination of the electromagnetic noise emission and the contact wear at the time of operation of the electromagnetic relay, but also the following effects can be obtained. Firstly, since the numbers of the electrodes (contacts) provided in the both ends of the substrate 54*a* can be made the same, it can be aimed to commonalize the connectors to be connected to the both ends of the substrate 54*a*, and to equalize the heat distribution in the longitudinal direction of the ceramic heater. Secondly, two of the three kinds of state transitions can be performed by the control of only the contactless switches. Therefore, since the state transition influenced by the waiting for the operation of the contact switch (the waiting for stabilization of the contact caused by the contact bounce of the relay) can be minimized, and the performance of the heater 54 can be maximized, the productivity for a small size sheet can be improved.

Note that, for convenience of description, although a noise filter, an energy saving function that cuts off the noise filter, etc. from the AC power supply 55 for energy saving, etc. are not illustrated, even if these circuits required for actual functions are added, the effects of the present invention do not change.

In the configuration that switches the power supply paths by using the contact switch as described above, the life reduction due to the electromagnetic noise emission from the contact switch and the contact wear can be eliminated. As described above, according to Embodiment 1, an apparatus can be provided in which the electromagnetic noise due to arc discharge is not emitted at the time of operation of the contact switch, and the life reduction due to contact wear does not occur, even in a case where the heat generation member supplying electric power is switched by using the contact switch.

Embodiment 2

[Heater and Power Control Unit]

Figure 6:
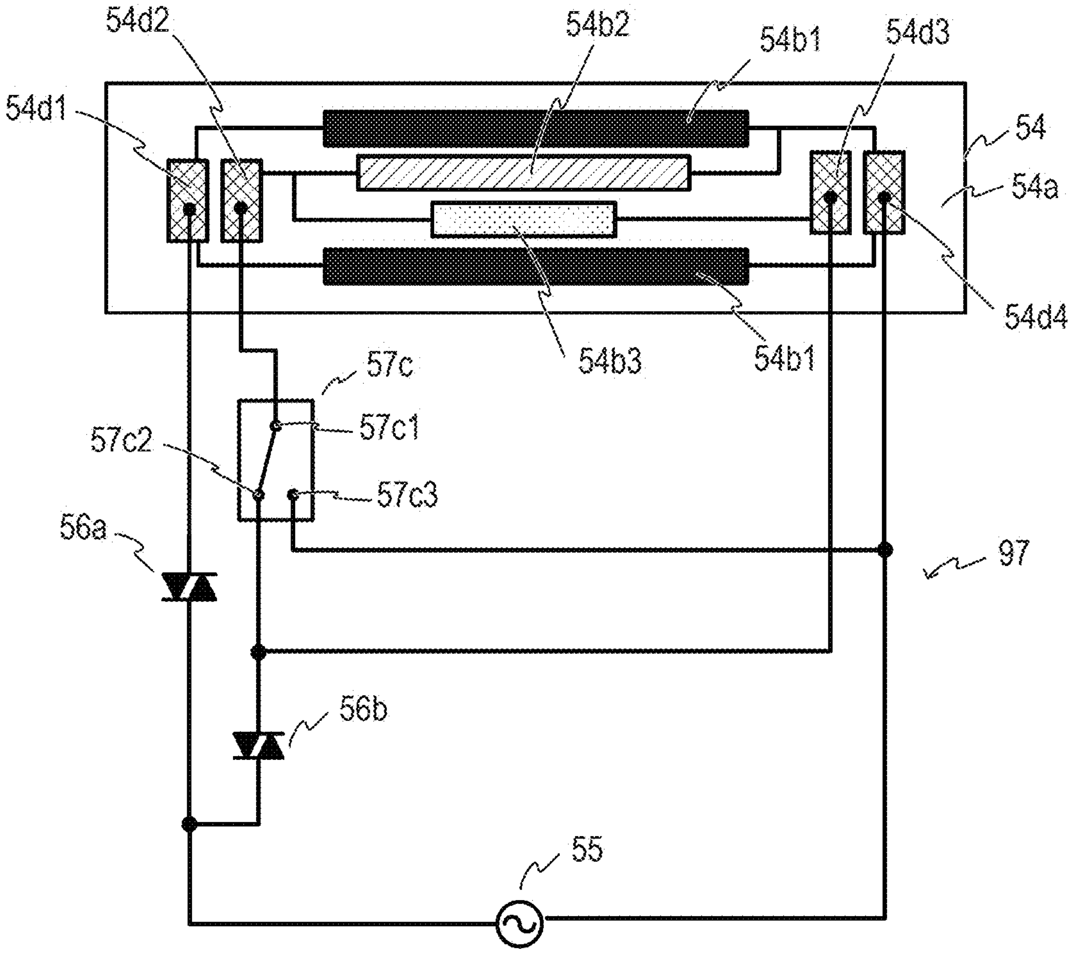
FIG. 6 is a diagram illustrating the heater and the heater control circuit described in Embodiment 2.

FIG. 6 illustrates the heater 54 and the power control unit 97 used in the heating apparatus of Embodiment 2. Since the heater 54 used in Embodiment 2 is common to the heater 54 in Embodiment 1, a description will be omitted. The power control unit 97 of Embodiment 2 has the configuration in which one triac 56*b* is used by combining the triac 56*b* and the triac 56*c* of FIG. 4A, and the electromagnetic relay 57*c* having the c-contact configuration, which is a second switching unit, is added. The present embodiment is characterized in that the electromagnetic relay 57*c* having the c-contact configuration plays both the role of selecting to which heat generation member the triac 56*b* is to be connected, and the role of the electromagnetic relay 57*c* having the a-contact configuration of FIG. 4A.

Specifically, the electromagnetic relay 57*c* having the c-contact configuration, which is the second switching unit, includes a contact 57*c*1 connected to the contact 54*d*2, a contact 57*c*2 connected to the triac 56*b* and the contact 54*d*3, and a contact 57*c*3 connected to the AC power supply 55 and the contact 54*d*4. The electromagnetic relay 57*c* is in a state where power is supplied to the heat generation member 54*b*2, when in a state where the contact 57*c*1 and the contact 57*c*2 are connected to each other. The electromagnetic relay 57*c* is in a state where power is supplied to the heat generation member 54*b*3, when in a state where the contact 57*c*1 and the contact 57*c*3 are connected to each other. In the electromagnetic relay 57*c*, when in a state where the contact 57*c*1 and the contact 57*c*3 are connected to each other, the electromagnetic relay 57*c* is in a state where the contact 54*d*2 and the contact 54*d*4 are connected to each other. Therefore, the electromagnetic relay 57*c* also functions as the first switching unit.

[Power Supply Path]

Figure 7A:
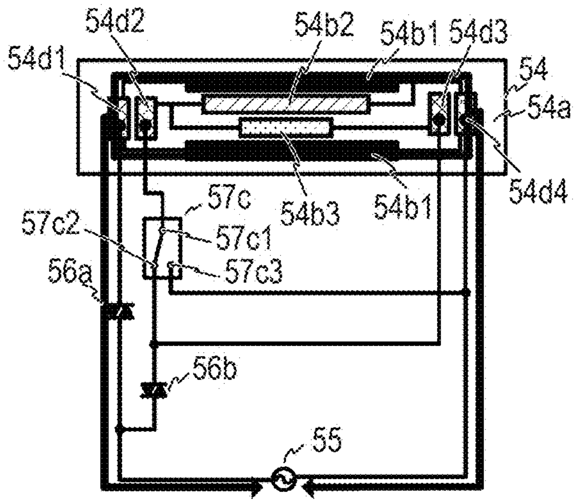
FIGS. 7A, 7B and 7C are diagrams illustrating the heater and the current path of the heater control circuit described in Embodiment 2.
Figure 7B:
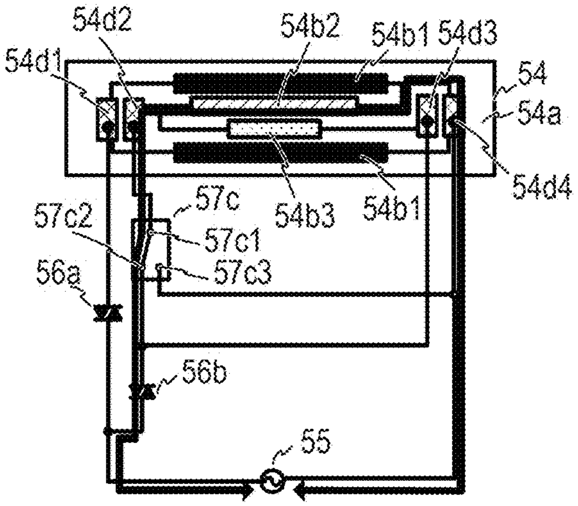
Figure 7C:
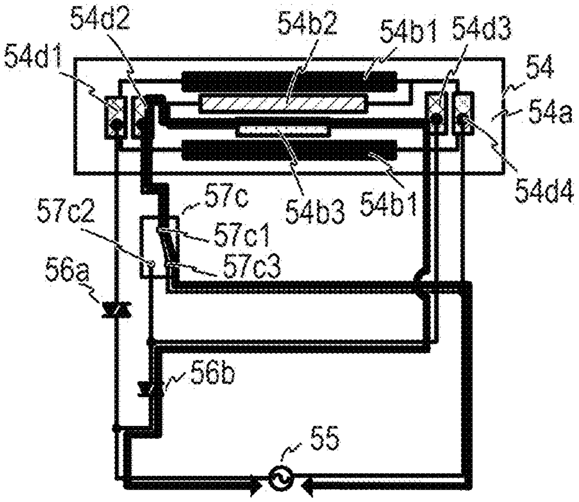

FIG. 7A to FIG. 7C illustrate three kinds of power supply paths to the heat generation members 54*b*1 to 54*b*3 in a case where the heater 54 and the power control unit 97 of Embodiment 2 are used. The current in a case where power is supplied from the AC power supply 55 to the heat generation member 54*b*1 flows in the route indicated by a bold line in FIG. 7A. The power supply from the AC power supply 55 to the heat generation member 54*b*1 is controlled by the triac 56*a*. At the time of the power supply to the heat generation member 54*b*1, the electromagnetic relay 57*c* may be in a state where the contact 57*c*1 and the contact 57*c*2 are connected to each other, or may be in a state where the contact 57*c*1 and the contact 57*c*3 are connected to each other.

The current in a case where power is supplied from the AC power supply 55 to the heat generation member 54*b*2 flows in the route indicated by a bold line in FIG. 7B. At this time, the contact 57*c*1 and the contact 57*c*2 are connected to each other, the electromagnetic relay 57*c* having the c-contact configuration is connected to the triac 56*b* and contact 54*d*4 side, and the power supply from the AC power supply 55 to the heat generation member 54*b*2 is controlled by the triac 56*b*. Since the contact impedance of the electromagnetic relay 57*c* having the c-contact configuration is sufficiently smaller than the heat generation member 54*b*3, a current hardly flows into the heat generation member 54*b*3, and only the heat generation member 54*b*2 can be made to generate heat.

The current in a case where power is supplied from the AC power supply 55 to the heat generation member 54*b*3 flows in the route indicated by a bold line in FIG. 7C. At this time, the contact 57*c*1 and the contact 57*c*3 are connected to each other, the electromagnetic relay 57*c* having the c-contact configuration is connected to the contact 54*d*3 side, and the power supply from the AC power supply 55 to the heat generation member 54*b*3 is controlled by the triac 56*b*. Since the contact impedance of the electromagnetic relay 57*c* having the c-contact configuration is sufficiently smaller than the heat generation member 54*b*2, a current hardly flows into the heat generation member 54*b*2, and only the heat generation member 54*b*3 can be made to generate heat.

The electromagnetic relay 57*c* having the c-contact configuration includes a first function to short-circuit (FIG. 7B) and to open (FIG. 7C) the heat generation member 54*b*2, by short circuit (FIG. 7B) and opening (FIG. 7C) of the contact 54*d*2 and the contact 54*d*4. Additionally, the electromagnetic relay 57*c* having the c-contact configuration includes a second function to short-circuit (FIG. 7C) and to open (FIG. 7B) the heat generation member 54*b*3. That is, the electromagnetic relay 57*c* having the c-contact configuration is characterized by including both the first function and the second function.

Here, the contact 57*c*1 and the contact 57*c*2 of the electromagnetic relay 57*c* having the c-contact configuration are connected to the both ends of the heat generation member 54*b*3. Accordingly, when the triac 56*b* is not conducted, the contact 57*c*1 and the contact 57*c*2 have the same electric potential, irrespective of whether in the open state or the short circuit state. Further, the contacts 57*c*1 and 57*c*3 of the electromagnetic relay 57*c* having the c-contact configuration are connected to the both ends of the heat generation member 54*b*2. Accordingly, when the triac 56*b* is not conducted, the contact 57*c*1 and the contact 57*c*3 have the same electric potential, irrespective of whether in the open state or the short circuit state. That is, when the triac 56*b* is not conducted, all of the contacts 57*c*1, 57*c*2 and 57*c*3 have the same electric potential. Accordingly, at the time of operation of the electromagnetic relay 57*c* having the c-contact configuration (the electromagnetic relay 57*c* is operated when the triac 56*b* is not conducted), arc discharge does not occur between any of the contacts of the electromagnetic relay 57*c* having the c-contact configuration. Accordingly, at the time of operation of the electromagnetic relay 57*c* having the c-contact configuration, electromagnetic noise is not emitted, and the contact wear (life reduction) due to arc discharge also does not occur.

The configuration of Embodiment 2 is synonymous with bearing the functions of the electromagnetic relay 57*a* having the a-contact configuration and the triac 56*c* illustrated in FIG. 4A of an Embodiment 1, only by the electromagnetic relay 57*c* having the c-contact configuration. Accordingly, the same functions as those in Embodiment 1 can be secured by selecting the configuration of Embodiment 2, while further suppressing the number of circuit components.

Note that, in the configuration of Embodiment 1, when in an abnormal state, i.e., when the triac 56*b* is in a conductive state, and the contact of the electromagnetic relay 57*a* having the a-contact configuration is in the short circuit state, the outgoing end of the AC power supply 55 will be in the short circuit state. In this case, it cannot be said that there is no possibility of causing fusing of a current fuse (not illustrated), and there is also a possibility of causing destruction of an apparatus. On the other hand, in the configuration of Embodiment 2, the outgoing end of the AC power supply 55 does not short-circuit, and it can be said that the configuration of Embodiment 2 is a more reliable configuration.

As described above, in the configuration that switches the power supply path by using the contact switch, the electromagnetic noise emission from the contact switch and the life reduction due to contact wear can be eliminated. In addition, an apparatus that is more inexpensive, that can save more space, and that is more reliable than the apparatus in Embodiment 1 can be provided. As described above, according to Embodiment 2, an apparatus can be provided in which the electromagnetic noise due to arc discharge is not emitted at the time of the contact switch operation, and the life reduction due to contact wear does not occur, even in a case where the heat generation member supplying electric power is switched by using the contact switch.

Embodiment 3

[Heater and Power Control Unit]

Figure 8:
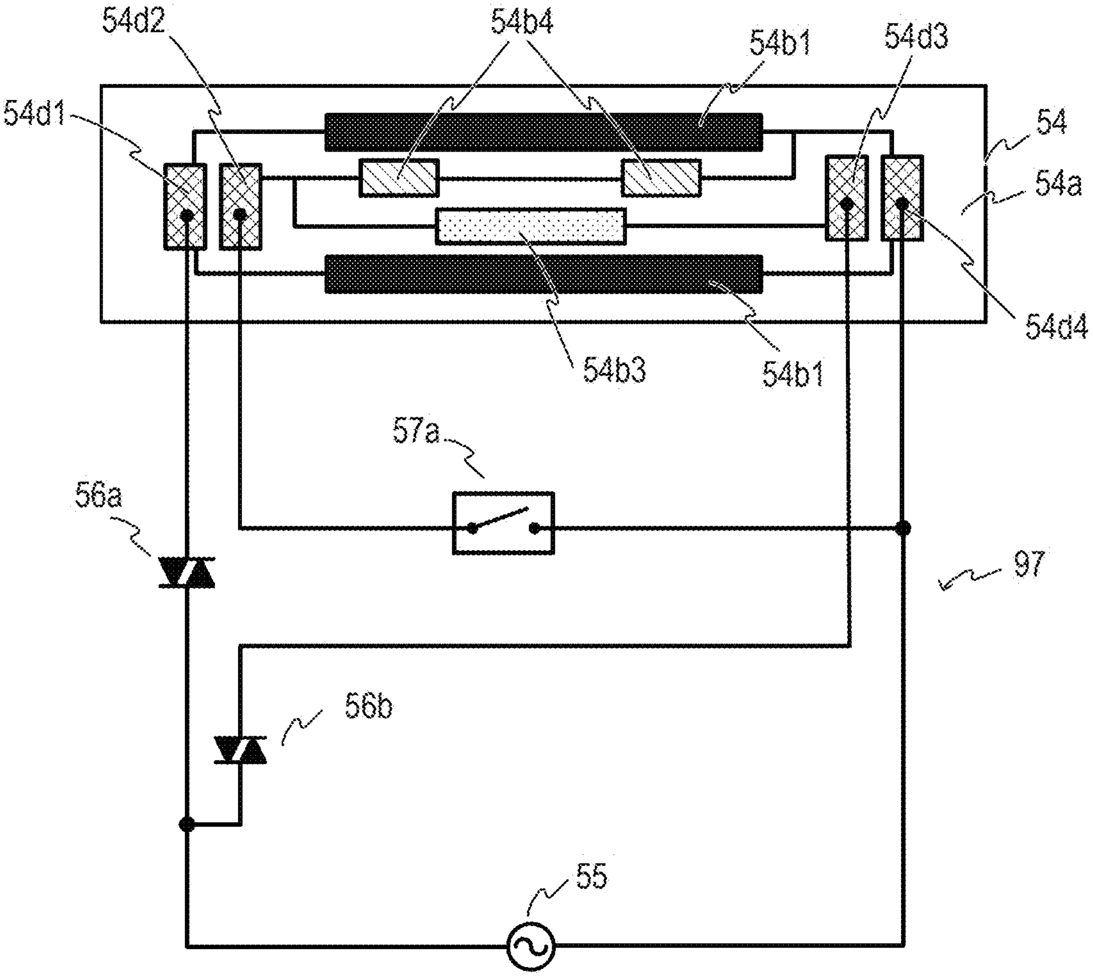
FIG. 8 is a diagram illustrating the heater and the heater control circuit described in Embodiment 3.

FIG. 8 illustrates the heater 54 and the power control unit 97 used in the heating apparatus of Embodiment 3. The heat generation members 54*b*1 and 54*b*3 of the heater 54 are the same as those in Embodiments 1 and 2. The length in the longitudinal direction of the heat generation member 54*b*4, which is the second heat generation member, is the length of the difference between the heat generation member 54*b*2 and the heat generation member 54*b*3 of the heater 54 of Embodiments 1 and 2. Two heat generation members 54*b*4 are arranged at both sides of the heat generation member 54*b*3 in the direction perpendicular to the longitudinal direction. That is, it is set so that the sum of the length in the longitudinal direction of the heat generation member 54*b*4 and the length in the longitudinal direction of the heat generation member 54*b*3 is the same as the length in the longitudinal direction of the heat generation member 54*b*2 of the heater 54. Although described later, there are cases where the heat generation member 54*b*3 and the heat generation member 54*b*4 are considered to be one heat generation member. Therefore, it is necessary that the resistance value per a unit length in the longitudinal direction of the heat generation member 54*b*3 and that of the heat generation member 54*b*4 are set to be equal.

[Power Supply Path]

Figure 9A:
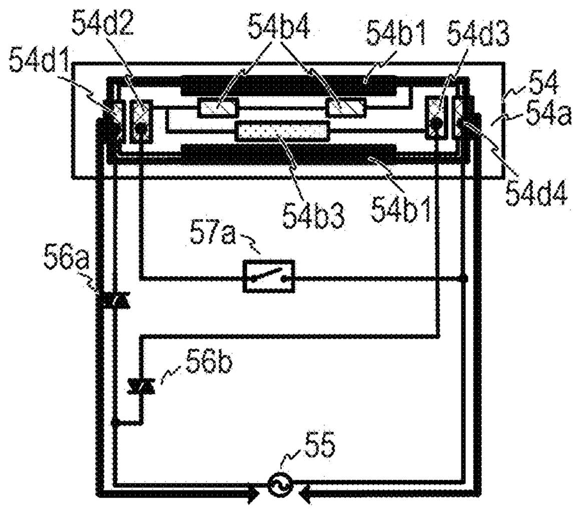
FIGS. 9A, 9B and 9C are diagrams illustrating the heater and the current path of the heater control circuit described in Embodiment 3.
Figure 9B:
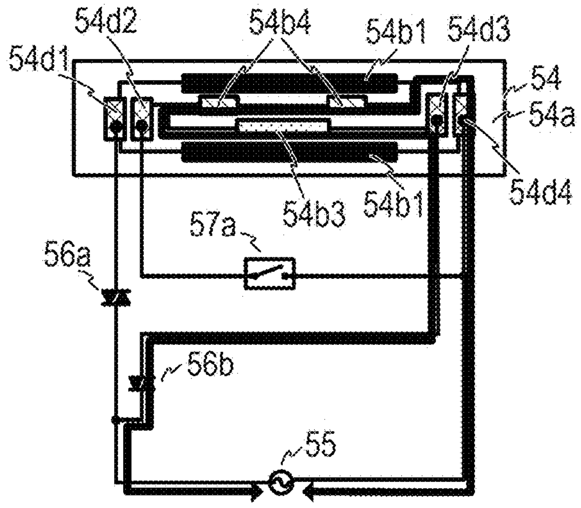
Figure 9C:
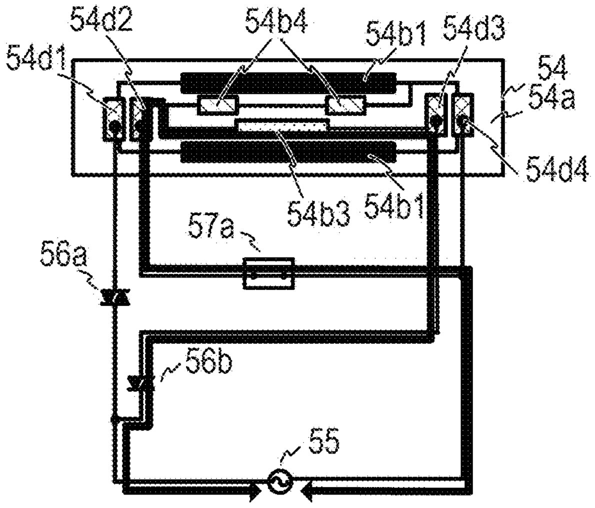

FIG. 9A to FIG. 9C illustrate three kinds of current paths to the heat generation members, in a case where the heater 54 and the power control unit 97 of Embodiment 3 are used. The current in a case where power is supplied from the AC power supply 55 to the heat generation member 54*b*1 flows in the route indicated by a bold line in FIG. 9A. The power supply from the AC power supply 55 to the heat generation member 54*b*1 is controlled by the triac 56*a*. In a case where power is supplied to the heat generation member 54*b*1, the electromagnetic relay 57*a* may be in the open state, or may be in the short circuit state.

The current in a case where power is supplied from the AC power supply 55 to the heat generation member 54*b*3 and the heat generation member 54*b*4 flows in the route indicated by a bold line in FIG. 9B. At this time, the contact of the electromagnetic relay 57*a* having the a-contact configuration is set to the open state, and a current flows through the heat generation member 54*b*3 and the heat generation member 54*b*4 in series. Hereinafter, the heat generation members 54*b*3 and 54*b*4 connected in series may be referred to as the in-series heat generation members. Accordingly, both the heat generation member 54*b*3 and the heat generation member 54*b*4 can generate heat, can provide heat to the same range as the heat generation member 54*b*2 in Embodiments 1 and 2 in the longitudinal direction of the heater 54, and can be considered as one heat generation member corresponding to, for example, the paper width of the B5 size. The power supply from the AC power supply 55 to the in-series heat generation members of the heat generation member **54*b*3 and the heat generation member 54*b*4 is controlled by the triac 56*b*. Since the contact impedance of the electromagnetic relay 57*a* having the a-contact configuration in the open state is sufficiently larger than the heat generation member 54*b*4, a current hardly flows into the electromagnetic relay 57*a* having the a-contact configuration, and only the heat generation member 54*b*3 and the heat generation member 54*b*4** can be made to generate heat.

The current in a case where power is supplied from the AC power supply 55 to the heat generation member **54*b*3 flows in the route indicated by a bold line in FIG. 9C. At this time, the contact of the electromagnetic relay 57*a* having the a-contact configuration is set to the short circuit state, and the power supply from the AC power supply 55 to the heat generation member 54*b*3 is controlled by the triac 56*b*. Since the contact impedance of the electromagnetic relay 57*a* having the a-contact configuration in the short circuit state is sufficiently smaller than the heat generation member 54*b*4, a current hardly flows into the heat generation member 54*b*4, and only the heat generation member 54*b*3 can be made to generate heat. Here, the both ends of the electromagnetic relay 57*a* having the a-contact configuration are connected to the both ends of the heat generation member 54*b*4. Therefore, as in Embodiment 1, at the time of operation of the electromagnetic relay 57*a*** having the a-contact configuration, electromagnetic noise is not emitted, and the contact wear (=the life reduction) due to arc discharge also does not occur.

Since the configuration of Embodiment 3 can use, as the electromagnetic relay **57*a*, an electromagnetic relay having the a-contact configuration that is more inexpensive and smaller than the electromagnetic relay 57*c* having the c-contact configuration used in Embodiment 2, there is a merit that the power control unit 97** can be made inexpensive and small.

It is necessary to design the heater 54 of Embodiment 3, so that a level difference (discontinuity of distribution of heat) is not generated in the distribution of heat in two boundary portions between the heat generation member **54*b*3 and the heat generation member 54*b*4 in the longitudinal direction. In practice, it is desirable to make a devise to make each of the heat generation members 54*b*3 and 54*b*4** into a tapered shape in the two boundary portions, etc.

Additionally, it must be noted that there will be restrictions about the resistance values of the heat generation member **54*b*3 and the heat generation member 54*b*4. Suppose the resistance value of the heat generation member 54*b*3 is R103, and the resistance value of the heat generation member 54*b*4 is R114. Since a resistance value Rs of the in-series resistors R103 and R114 has the relationship Rs=R103+R114, it is always necessary that Rs>R103. However, the power required for the in-series heat generation members (the resistance value Rs) that heat the paper P having a width wider than the width of the heat generation member 54*b*3 is higher than the power required for the heat generation member 54*b*3, and as for the resistance value, it is required that Rs has a lower resistance value than R103. Accordingly, the resistance value Rs of the in-series heat generation members is determined first, and then, a value lower than the resistance value Rs is set to the resistance value R103 of the heat generation member 54*b*3. That is, it is required that the resistance value R103 of the heat generation member 54*b*3 is set to a resistance value lower than the resistance value calculated from the required power, and the setting for the heat generation member 54*b*3 has to be over-engineered. In consideration of this point, when using the configuration of Embodiment 3, it is necessary to establish an adequate protection systems, etc. for the heat generation member 54*b*3**.

In this manner, in the configuration that switches the power supply path by using the contact switch, the electromagnetic noise emission from the contact switch and the life reduction due to contact wear can be eliminated. In addition, the power control unit 97 can be made more inexpensive and smaller than the power control unit 97 in Embodiment 2. As described above, according to Embodiment 3, an apparatus can be provided in which the electromagnetic noise due to arc discharge is not emitted at the time of operation of the contact switch, and the life reduction due to contact wear does not occur, even in a case where the heat generation member supplying electric power is switched by using the contact switch.

Embodiment 4

[Heater and Power Supply Unit]

Figure 10:
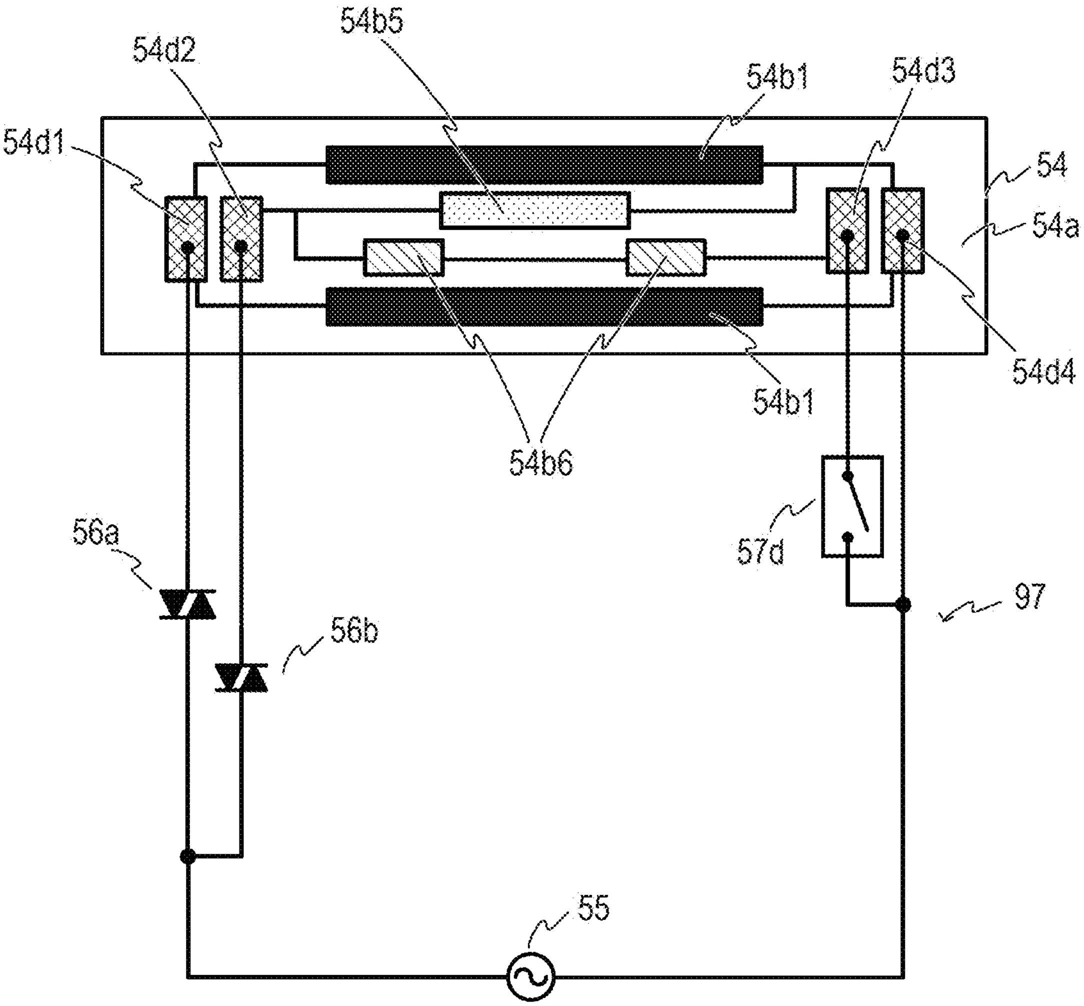
FIG. 10 is a diagram illustrating the heater and the heater control circuit described in Embodiment 4.

FIG. 10 illustrates the heater 54 and the power supply unit used in the heating apparatus of Embodiment 4. The length in the longitudinal direction of the heat generation member **54*b*5, which is the second heat generation member, formed on the heater 54 is the same as the length of the heat generation member 54*b*3 of the heater 54 used in Embodiments 1 to 3. However, the heat generation member 54*b*5 is different in that the contacts to which the heat generation member 54*b*5 is connected are the contact 54*d*2 and the contact 54*d*4. Additionally, although the length in the longitudinal direction and shape (the shape separated into two) of a heat generation member 54*b*6, which is the third heat generation member, are also the same as those of the heat generation member 54*b*4 of the heater 54 used in Embodiment 3, the heat generation member 54*b*6 is different in that the contacts connected are the contact 54*d*2 and the contact 54*d*3. Additionally, the electromagnetic relay 57*d*, which is a third switching unit, is an electromagnetic relay having the a-contact configuration, one end is connected to the contact 54*d*3, and the other end is connected to the second pole of the AC power supply 55 and the contact 54*d*4**.

[Power Supply Path]

Figure 11A:
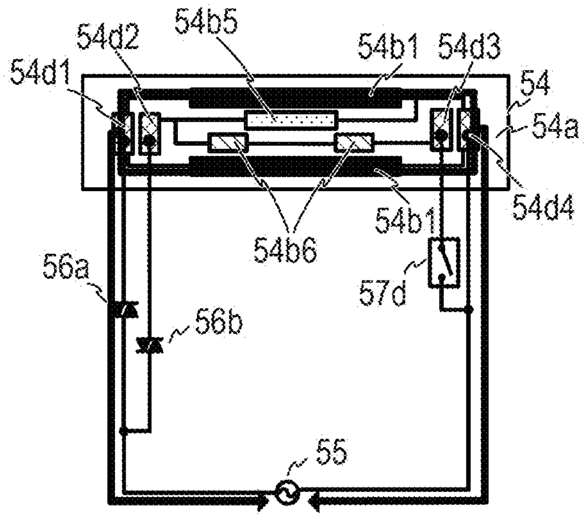
FIGS. 11A, 11B and 11C are diagrams illustrating the heater and the current path of the heater control circuit described in Embodiment 4.
Figure 11B:
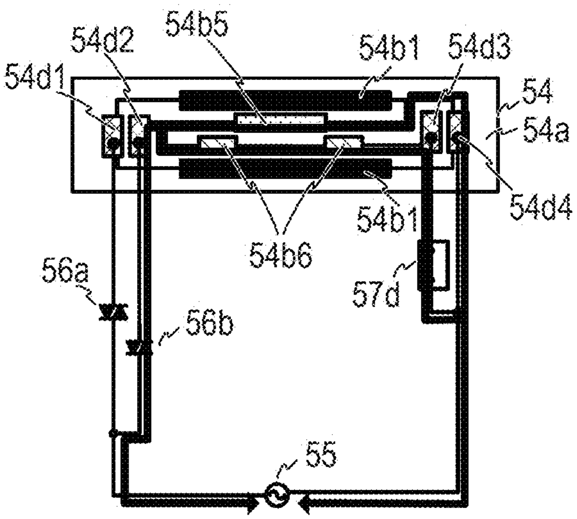
Figure 11C:
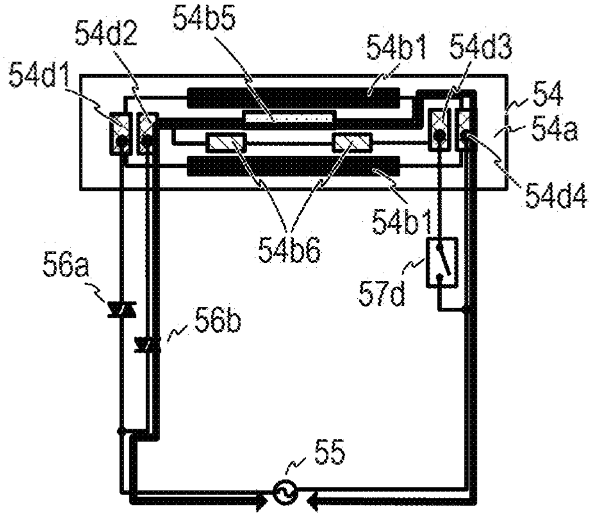

FIG. 11A to FIG. 11C illustrate three kinds of current paths to the heat generation members in a case where the heater 54 and the power control unit 97 of Embodiment 4 are used. The current in a case where power is supplied from the AC power supply 55 to the heat generation member **54*b*1 flows in the route indicated by a bold line in FIG. 11A. The power supply from the AC power supply 55 to the heat generation member 54*b* 1 is controlled by the triac 56*a*. In a case where power is supplied to the heat generation member 54*b*1, the electromagnetic relay 57*d*** may be in the open state, or may be in the short circuit state.

The current in a case where power is supplied from the AC power supply 55 to the heat generation member **54*b*5 and the heat generation member 54*b*6 flows in the route indicated by a bold line in FIG. 11B. At this time, the contact of the electromagnetic relay 57*d* having the a-contact configuration is set to the short circuit state, and a current flows through the heat generation member 54*b*5 and the heat generation member 54*b*6 in parallel. Hereinafter, the heat generation member 54*b*5 and the heat generation member 54*b*6 connected in parallel may be referred to as the parallel heat generation members. Accordingly, both the heat generation member 54*b*5 and the heat generation member 54*b*6** can generate heat, and can be considered as one heat generation member corresponding to, for example, the paper width of the B5 size in the longitudinal direction of the heater 54. The power supply from the AC power supply 55 to the parallel heat generation members of the heat generation member **54*b*5 and the heat generation member 54*b*6 is controlled by the triac 56*b***.

The current in a case where power is supplied from the AC power supply 55 to the heat generation member **54*b*5 flows in the route indicated by a bold line in FIG. 11C. At this time, the contact of the electromagnetic relay 57*d* having the a-contact configuration is set to the open state, and the power supply from the AC power supply 55 to the heat generation member 54*b*5 is controlled by the triac 56*b*. Since the contact impedance of the electromagnetic relay 57*d* having the a-contact configuration in the open state is sufficiently larger than the heat generation member 54*b*5, a current hardly flows into the heat generation member 54*b*6, and only the heat generation member 54*b*5 can be made to generate heat. Here, the both ends of the electromagnetic relay 57*d* having the a-contact configuration are connected to the both ends of the in-series heat generation members of the heat generation member 54*b*5 and the heat generation member 54*b*6. Therefore, as in Embodiment 1, electromagnetic noise is not emitted at the time of operation of the electromagnetic relay 57*a*** having the a-contact configuration, and the contact wear (=the life reduction) due to arc discharge also does not occur.

Similar to Embodiment 3, also in the configuration of Embodiment 4, there are restrictions about the resistance values of the heat generation member **54*b*5 and the heat generation member 54*b*6. Suppose the resistance value of the heat generation member 54*b*5 is R116, and the resistance value of the heat generation member 54*b*6 is R117. A resistance value Rp of the parallel heat generation members of the heat generation members 54*b*5 and 54*b*6 has the relationship 1/Rp=(1/R116)+(1/R117). In a case where it is assumed that the resistance value R116 of the heat generation member 54*b*5 is set to 110Ω, and the resistance value Rp of the parallel heat generation members is set to 90Ω, it is necessary to set the resistance value R117 of the heat generation member 54*b*6 to 495Ω. It is necessary to use a resistant material having a resistivity higher (specifically, about two times) than the resistivity of the heat generation member 54*b*5 for the heat generation member 54*b*6. As described above, the heater 54 used in Embodiment 3 and the heater 54** used in Embodiment 4 have respective different restrictions imposed on the setting of the resistance values of the heat generation members. Therefore, it is desirable to select the unit corresponding to design conditions.

As described above, in the configuration that switches the power supply path by using the contact switch, the electromagnetic noise emission from the contact switch and the life reduction due to contact wear can be eliminated. As described above, according to Embodiment 4, an apparatus can be provided in which the electromagnetic noise due to arc discharge is not emitted at the time of operation of the contact switch, and the life reduction due to contact wear does not occur, even in a case where the heat generation member supplying electric power is switched by using the contact switch.

According to the present invention, an apparatus can be provided in which the electromagnetic noise due to arc discharge is not emitted at the time of operation of the contact switch, and the life reduction due to contact wear does not occur, even in a case where the heat generation member supplying electric power is switched by using the contact switch.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-006465, filed Jan. 18, 2019, which is hereby incorporated by reference herein in its entirety.

What is claimed is:

1. A heating apparatus comprising:

a first heat generation member provided on the substrate and extending in a longitudinal direction of the substrate;

a second heat generation member provided on the substrate and extending in the longitudinal direction of the substrate, wherein a length of the second heat generation member in the longitudinal direction is shorter than a length of the first heat generation member in the longitudinal direction, the second heat generation member being provided within a length range of the first heat generation member in the longitudinal direction, and being provided in a different position from a position of the first heat generation member in a lateral direction of the substrate perpendicular to the longitudinal direction of the substrate and a thickness direction of the substrate;

a third heat generation member provided on the substrate and extending in the longitudinal direction of the substrate, wherein a length of the third heat generation member in the longitudinal direction is shorter than a length of the second heat generation member in the longitudinal direction, the third heat generation member being provided within a length range of the second heat generation member in the longitudinal direction, and being provided in a different position from a position of the first heat generation member and the second heat generation member in the lateral direction of the substrate;

a first triac configured to switch power supply to the first heat generation member on and off;

a second triac configured to switch power supply to the second heat generation member or the third heat generation member on and off; and a switch configured to exclusively switch between (i) a first state of supplying power to the second heat generation member via the second triac without supplying power to the third heat generation member and (ii) a second state of supplying power to the third heat generation member via the second triac without supplying power to the second heat generation member.

2. The heating apparatus according claim 1, wherein the switch has a first contact connected to one end of the second heat generation member and to one end of the third heat generation member, a second contact connected to another end of the second heat generation member and a third contact connected to another end of the third heat generation member, wherein the switch connects, in a case where power is supplied to the second heat generation member, the first contact with the third contact, and in a case where a power is supplied to the third heat generation member, the first contact with the second contact.

3. The heating apparatus according to claim 2, wherein when the first triac is switched on, power is supplied to the first heat generation member.

4. The heating apparatus according to claim 3, wherein when the second triac is switched on and the first contact is connected with the third contact by the switch, power is supplied to the second heat generation member.

5. The heating apparatus according to claim 4, wherein when the second triac is switched on and the first contact is connected with the second contact by the switch, power is supplied to the third heat generation member.

6. The heating apparatus according to claim 1, further comprising:

a first electrode, provided on the substrate, to which one end of the first heat generation member is connected;

a second electrode, provided on the substrate, to which one end of the second heat generation member and one end of the third heat generation member are connected;

a third electrode, provided on the substrate, to which another end of the third heat generation member is connected; and a fourth electrode, provided on the substrate, to which another end of the first heat generation member and another end of the second heat generation member are connected, wherein in the longitudinal direction of the substrate, the first electrode and the second electrode are located closer to one end of the substrate than the first heat generation member, and wherein in the longitudinal direction of the substrate, the third electrode and the fourth electrode are located closer to the other end of the substrate than the first heat generation member.

7. A heating apparatus comprising:

a substrate;

a first heat generation member provided on the substrate;

a second heat generation member and a third heat generation member, provided on the substrate, each of which has a length in a longitudinal direction of the substrate that is shorter than a length of the first heat generation member in the longitudinal direction of the substrate;

a fourth heat generation member having a length that is the same as the length of the first heat generation member, a first triac configured to switch power supply to the first heat generation member on and off;

a second triac configured to switch power supply to the second heat generation member or the third heat generation member on and off; and a contact relay configured to exclusively switch between supplying power to the second heat generation member and supplying power to the third heat generation member, wherein the second heat generation member and the third heat generation member are provided between the first heat generation member and the fourth heat generation member in a lateral direction of the substrate perpendicular to the longitudinal direction of the substrate and a thickness direction of the substrate.

8. The heating apparatus according to claim 7, wherein the second heat generation member and the third heat generation member are provided within a longitudinal range of the first heat generation member.

9. The heating apparatus according to claim 1, further comprising:

a cylindrical fixing film;

a pressure roller, and a nip forming member provided in an inner space of the fixing film, the nip forming member holding the substrate, wherein the pressure roller is configured to contact an outer surface of the fixing film and form a fixing nip for nipping and conveying a sheet between the fixing film and the pressure roller in cooperation with the nip forming member through the fixing film, and wherein the heating apparatus heats an image formed on the sheet nipped at the fixing nip by heat generated by the first, second, and third heat generation members.

10. An image forming apparatus comprising:

an image forming unit configured to form an image on a sheet; and a heating apparatus according to claim 1, wherein the heating apparatus heats the image formed on the sheet.

11. The heating apparatus according to claim 9, wherein the first heat generation member has a length in the longitudinal direction corresponding to a length of a first sheet in a width direction orthogonal to a conveyance direction of the first sheet;

wherein the second heat generation member has a length in the longitudinal direction corresponding to a length of a second sheet in the width direction, the length of the second sheet in the width direction being shorter than the length of the first sheet in the width direction; and wherein the third heat generation member has a length in the longitudinal direction corresponding to a length of a third sheet in the width direction, the length of the third sheet in the width direction being shorter than the length of the second sheet in the width direction.

12. The heating apparatus according to claim 1, wherein the substrate is made of ceramics.

13. The heating apparatus according to claim 1, wherein the first and second heat generation members or the first and third heat generation members are heated by selectively switching on the first triac and the second triac.

14. The heating apparatus according to claim 8, wherein when the first triac is switched on, power is supplied to the first heat generation member.

15. The heating apparatus according to claim 14, wherein when the second triac is switched on and the first contact is connected with the third contact by the switch, power is supplied to the second heat generation member.

16. The heating apparatus according to claim 15, wherein when the second triac is switched on and the first contact is connected with the second contact by the switch, power is supplied to the third heat generation member.

17. The heating apparatus according to claim 7, further comprising:

a first electrode, provided on the substrate, to which one end of the first heat generation member is connected;

a second electrode, provided on the substrate, to which one end of the second heat generation member and one end of the third heat generation member are connected;

a third electrode, provided on the substrate, to which another end of the third heat generation member is connected; and a fourth electrode, provided on the substrate, to which another end of the first heat generation member and another end of the second heat generation member are connected, wherein in the longitudinal direction of the substrate, the first electrode and the second electrode are located closer to one end of the substrate than the first heat generation member, and wherein in the longitudinal direction of the substrate, the third electrode and the fourth electrode are located closer to the other end of the substrate than the first heat generation member.

* * * * *